US008290693B2

(12) United States Patent
Shoda et al.

(10) Patent No.: US 8,290,693 B2
(45) Date of Patent: Oct. 16, 2012

(54) INTERNAL-COMBUSTION-ENGINE AUTOMATIC STOP AND RESTART SYSTEM

(75) Inventors: Tomohisa Shoda, Chiyoda-ku (JP); Osamu Ishikawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 56 days.

(21) Appl. No.: 12/953,957

(22) Filed: Nov. 24, 2010

(65) Prior Publication Data

US 2011/0239974 A1 Oct. 6, 2011

(30) Foreign Application Priority Data

Mar. 30, 2010 (JP) ................................. 2010-077825

(51) Int. Cl.
*F02D 41/06* (2006.01)

(52) U.S. Cl. ................. 701/113; 123/179.4; 123/179.18; 123/179.25

(58) Field of Classification Search ............... 123/179.3, 123/179.4, 179.16, 179.18, 179.25, 179.28, 123/399; 701/112, 113
See application file for complete search history.

(56) References Cited

U.S. PATENT DOCUMENTS 6,441,506 B2 * 8/2002 Nakashima ................. 290/40 C
2011/0172900 A1 * 7/2011 Mukaihara et al. ........... 701/112
2011/0184626 A1 * 7/2011 Mauritz et al. ................ 701/102

FOREIGN PATENT DOCUMENTS

| JP | 2005-113781 A | 4/2005 |
|---|---|---|
| JP | 2005330813 | 12/2005 |
| JP | 2006-242082 A | 9/2006 |
| JP | 2007-327365 A | 12/2007 |
| WO | 2010012530 A1 | 2/2010 |

* cited by examiner

Primary Examiner — Hai Huynh
(74) Attorney, Agent, or Firm — Sughrue Mion, PLLC

(57) ABSTRACT

An internal-combustion-engine automatic stop and restart system performs restarting control by making the pinion pushing unit push out the pinion gear so as to engage with the ring gear, when the restarting condition is satisfied in a time period from a time when the automatic stopping condition is satisfied to a time when the rotation of the internal combustion engine stops. A throttle valve control unit opens the throttle valve even when the restarting condition has not been satisfied and stops control of the throttle valve in a time period from when the rotation of the internal combustion engine stops to when the restarting condition is satisfied, when the rotation speed of the internal combustion engine becomes lower than a predetermined value in a time period from when the automatic stopping condition is satisfied to when the rotation of the internal combustion engine stops.

5 Claims, 10 Drawing Sheets

INTERNAL-COMBUSTION-ENGINE AUTOMATIC STOP AND RESTART SYSTEM

BACKGROUND OF THE INVENTION

1. Field of the Invention

The present invention relates to an internal-combustion-engine automatic stop and restart system that automatically stops an internal combustion engine when a predetermined automatic stopping condition is satisfied while the internal combustion engine is operated, and that restarts the internal combustion engine when a predetermined restarting condition is satisfied while the internal combustion engine is in the automatic stopping mode.

2. Description of the Related Art

In recent years, among internal combustion engines mounted in a vehicle, there has been provided an internal combustion engine in which an internal-combustion-engine automatic stop and restart system (idling stop system) is adopted for the main purpose of reducing fuel consumption. The foregoing internal-combustion-engine automatic stop and restart system is configured in such a way as to automatically stop an internal combustion engine when a predetermined automatic stopping condition is satisfied while the internal combustion engine is operated and to automatically restart the internal combustion engine when the driver performs operation for making the vehicle move and a predetermined restarting condition is satisfied.

By utilizing such an internal-combustion-engine (although referred to also as an engine, it will be referred to as an internal combustion engine herein) automatic stop and restart system, an internal combustion engine that has come into the automatic stopping mode stops while inertially rotating and hence the rotation speed of the internal combustion engine becomes "0"; however, when the internal combustion engine inertially rotates, the internal combustion engine performs the intake stroke, the compression stroke, the power stroke, and the exhaust stroke even under the condition that no fuel is supplied, and the rotation speed of the internal combustion engine fluctuates periodically; then, the periodical fluctuation of the rotation speed causes a vibration.

To date, there has been disclosed a technology (e.g., refer to Japanese Patent Application Laid-Open No. 2007-327365), as a unit for suppressing a vibration caused by the periodical fluctuation in rotation while an internal combustion engine inertially rotates, in which, in order to solve the foregoing problem, the throttle valve provided in the intake pipe is closed until the intake pressure of the internal combustion engine reaches a predetermined pressure and fuel supply is prohibited until the intake pressure becomes the same as or larger than the predetermined pressure.

Moreover, there has been disclosed a technology (e.g., refer to Japanese Patent Application Laid-Open No. 2006-242082) in which the status of an internal combustion engine that has come into the stop mode is estimated and the throttle valve and the like are controlled in accordance with the result of the estimation so that the air-intake amount is changed and hence a vibration is suppressed, and in which, in the case where the rotation speed of the internal combustion engine is the same as or lower than a predetermined speed, the throttle valve is opened and the control amount for the throttle valve is made to vary based on the amount of decrease in the rotation speed of the internal combustion engine.

Furthermore, in the conventional internal-combustion-engine automatic stop and restart system, there has been a problem that, even when the restarting condition is satisfied through the driver's operation of making the vehicle move while the internal combustion engine that has come into the automatic stopping mode inertially rotates, it is difficult to make the pinion gear provided on the starter motor and the ring gear provided in the internal combustion engine engage with each other, because there is produced a rotation-speed difference between the ring gear and the pinion gear, whereby the internal combustion engine cannot be restarted until the rotation of the internal combustion engine stops. There has been disclosed a technology (e.g., refer to Japanese Patent Application Laid-Open No. 2005-113781) in which, in order to solve this problem, the starter motor is rotated in accordance with the rotation fluctuation periodically caused while the internal combustion engine inertially rotates so that the pinion gear is engaged with the ring gear when the rotation-speed difference between the ring gear and the pinion gear becomes small.

In the conventional technology disclosed in Japanese Patent Application Laid-Open No. 2007-327365, fuel supply is kept prohibited until the intake pressure becomes the same as or higher than a predetermined pressure; thus, it is not made possible to restart the internal combustion engine until the intake pressure becomes the same as or higher than the predetermined pressure, even if the driver performs operation of making the vehicle move while the internal combustion engine inertially rotates. Accordingly, the delay of restarting hinders the driver from making the vehicle move as he likes, whereby the driver may sense discomfort.

In the conventional technology disclosed in Japanese Patent Application Laid-Open No. 2006-242082, the throttle valve is controlled even after the internal combustion engine has stopped; therefore, electric power may be consumed wastefully. Furthermore, the control amount for the throttle valve is changed in accordance with the amount of decrease in the rotation speed of the internal combustion engine; thus, there may be caused a combustion failure, because, when there exists a restart request after the control amount for the throttle valve has been changed, the amount of air becomes too much or too small.

In addition, in the conventional technology disclosed in Japanese Patent Application Laid-Open No. 2005-113781, in the case where the fluctuation in the rotation speed of the internal combustion engine is large or the amount of decrease in the rotation speed is large, the control of the starter motor cannot keep up with the change in the rotation speed of the internal combustion engine; therefore, it may become impossible to restart the internal combustion engine while the internal combustion engine inertially rotates, because there continues the state where it is difficult for the pinion gear and the ring gear to engage with each other. Furthermore, in the conventional technology disclosed in Japanese Patent Application Laid-Open No. 2005-113781, the starter motor is rotated in accordance with the periodic rotation fluctuation caused while the internal combustion engine inertially rotates; therefore, there exists a problem that the calculation load on the internal combustion unit becomes large, because it is required that, taking the characteristics such as the responsiveness of the starter motor into account, there is performed control of the starter motor in accordance with each of the intake stroke, the compression stroke, the power stroke, and the exhaust stroke.

SUMMARY OF THE INVENTION

The present invention has been implemented in order to solve the foregoing problems in conventional systems; the objective thereof is to provide an internal-combustion-engine automatic stop and restart system that can rapidly restart an internal combustion engine when the restarting condition is satisfied while the internal combustion engine that has come into the automatic stopping mode inertially rotates and that prevents the calculation load on an internal combustion engine control unit from becoming excessive.

An internal-combustion-engine automatic stop and restart system according to the present invention performs automatic stopping operation for automatically stopping an internal combustion engine when an automatic stopping condition is satisfied while the internal combustion engine is operated and performs restarting operation for restarting the internal combustion engine when a restarting condition is satisfied while the internal combustion engine is in an automatic stopping operation; the internal-combustion-engine automatic stop and restart system includes a rotation speed calculation unit that calculates a rotation speed of the internal combustion engine; a throttle valve that adjusts intake air of the internal combustion engine; a ring gear coupled with the crankshaft of the internal combustion engine; a pinion gear that is driven to rotate by a starter motor for restarting the internal combustion engine; a pinion pushing unit that pushes out the pinion gear toward the ring gear; a restarting control unit that performs restarting control of the internal combustion engine by making the pinion pushing unit push out the pinion gear so as to engage the pinion gear with the ring gear, when the restarting condition is satisfied in a time period from a time instant when the automatic stopping condition is satisfied to a time instant when the rotation of the internal combustion engine stops; and a throttle valve control unit that opens the throttle valve even when the restarting condition has not been satisfied and stops control of the throttle valve in a time period from a time instant when the rotation of the internal combustion engine stops to a time instant when the restarting condition is satisfied, when the rotation speed of the internal combustion engine calculated by the rotation speed calculation unit becomes lower than a predetermined value in a time period from a time instant when the automatic stopping condition is satisfied to a time instant when the rotation of the internal combustion engine stops.

In the internal-combustion-engine automatic stop and restart system according to the present invention, the throttle valve is opened even when the restarting condition is not satisfied, when the rotation speed of the internal combustion engine becomes lower than a predetermined value while the internal combustion engine, which has come into the automatic stopping mode, inertially rotates; therefore, even when the restarting condition is satisfied before the rotation of the internal combustion engine stops, air to be supplied to the internal combustion engine does not become too little when the internal combustion engine is restarted, whereby the internal combustion engine can be restarted immediately after the restarting condition is satisfied. Moreover, because control of the throttle valve is stopped in a time period from a time instant when the rotation of the internal combustion engine stops to a time instant when the restarting condition is satisfied, the throttle valve is not wastefully operated, whereby consumption of electric power can be suppressed.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
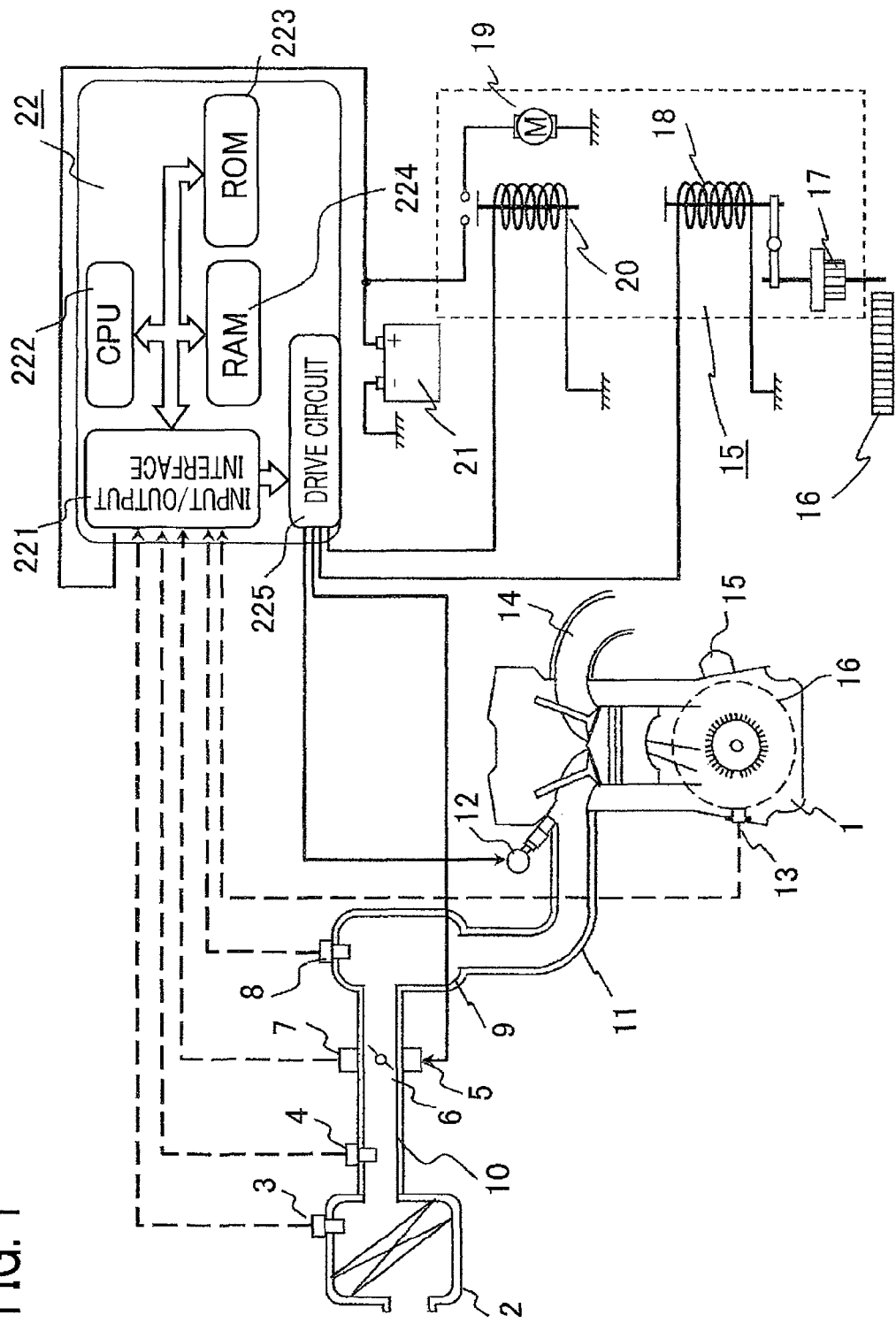
FIG. 1 is a configuration diagram illustrating an internal-combustion-engine automatic stop and restart system according to Embodiment 1 of the present invention.

Hereinafter, an internal-combustion-engine automatic stop and restart system according to Embodiment 1 of the present invention will be explained with reference to the drawings. FIG. 1 is a configuration diagram illustrating an internal-combustion-engine automatic stop and restart system according to Embodiment 1 of the present invention. In FIG. 1, an internal combustion engine 1 is provided with an intake pipe 10 that takes in air to be supplied to the internal combustion engine 1 and an exhaust pipe 14 that exhausts exhaust air from the internal combustion engine 1. An air filter 2 is provided at the upstream side of the intake pipe 10; at the downstream side of the air filter 2, there are provided an air flow sensor 4 and an intake air temperature sensor 3 that detects the temperature of intake air. At the downstream side of the air flow sensor 4, there are provided a throttle valve 6 that adjusts the flow rate of intake air by unit of a motor 5 and a throttle opening degree sensor 7 that detects the opening degree of the throttle valve 6.

At the downstream side of the throttle valve 6, there is provided a surge tank 9; on the surge tank 9, there is provided an intake pressure sensor 8 that detects an intake pressure. Furthermore, at the downstream side of the surge tank 9, there is provided an intake manifold 11 that supplies intake air to the respective combustion chambers of the cylinders of the internal combustion engine 1. In the vicinity of the intake port of each cylinder, there is provided a fuel injection valve 12; a mixture gas consisting of air and fuel supplied from the fuel injection valve 12 is taken in by the combustion chamber of each cylinder through an intake valve. An unillustrated ignition plug sets fire on a mixture gas taken in by the combustion chamber of each cylinder, so that the mixture gas combusts; the combustion gas produced through the combustion is exhausted from the exhaust pipe 14 to the air through an unillustrated catalyst.

In the internal combustion engine 1, there are provided an unillustrated water temperature sensor that detects the temperature of a coolant for the internal combustion engine 1 and crank angle sensor 13 that detects a signal that is outputted each time the crankshaft 13 of the internal combustion engine 1 pivots by a predetermined angle; based on the signal detected by the crank angle sensor 13, an internal combustion engine control unit (referred to as an ECU, hereinafter) 22, described later, detects the crank angle and calculates the rotation speed of the internal combustion engine 1.

Furthermore, in the internal combustion engine 1, there is provided a starter 15 that drives and rotates a ring gear 16 provided in the internal combustion engine 1 when the internal combustion engine 1 is started by unit of an unillustrated key (key-on starting) or restarted. The starter 15 includes a pinion gear 17 that drives and rotates a ring gear 16, a pinion pushing device 18 that pushes out the pinion gear 17 toward the ring gear 16 in order to make the pinion gear 17 engage with the ring gear 16, and a starter motor driving device 20 that drives a starter motor 19 so as to drive and rotate the pinion gear 17. A drive signal from the ECU 22 separately drives the starter motor driving device 20 and the pinion pushing device 18. The operation of the starter 15 will be explained later. Furthermore, a battery 21 supplies electric power to the starter 15, the ECU 22, and the various kinds of sensors described above.

The ECU 22 is provided with an input/output interface that inputs the output signals of the various kinds of sensors described above, detection signals such as the amount of depression of an unillustrated accelerator pedal and the amount of depression of an unillustrated brake pedal; a CPU (microprocessor) 222 that calculates whether or not the starting, stopping, and restarting of the internal combustion engine 1 can be controlled, and transmits a drive signal to a drive circuit 225, described later; a ROM (read only memory) 223 that stores various kinds of constants and control programs utilized in various kinds of calculations by the CPU 222; a RAM (random access memory) that temporally stores the results of calculations by the CPU 222; and the drive circuit 225 that transmits drive signals to the fuel injection valve 12 and the like, in accordance with calculation results from the CPU 222.

The ECU 22 not only calculates the rotation speed of the internal combustion engine 1, based on the detection signal from the crank angle sensor 13 but also determines the operation status of the internal combustion engine 1 by use of the control programs and the control constants stored in the ROM 223, based on the signals from the various kinds of sensors such as the intake air temperature sensor 3 and the like; the ECU 22 also outputs drive signals and the amount of control corresponding to the will of a driver to the fuel injection valve 12, the motor 5, and the like. The ECU 22 is configured in such a way as to determine whether or not the automatic stopping condition or the restarting condition for the internal combustion engine 1 has been satisfied and to control the throttle valve 6 at a time when the internal combustion engine is in the automatic stopping mode or the starter 15 at a time when the internal combustion engine is restarted.

Here, the operation of the starter 15 will be explained. At fast, when the internal combustion engine 1 is started through key-on starting, or when, after the internal combustion engine 1 has come into the automatic stopping mode, the operation status of the internal combustion engine 1 satisfies the restarting condition, the CPU 222 performs starting calculation or restarting calculation for the internal combustion engine 1, based on the output signals from the various kinds of sensors inputted to the ECU 22 through the input/output interface 221. Then, based on the result of the calculation, the drive circuit 225 in the ECU 22 transmits a drive signal to the pinion pushing device 18 so as to start the energization of the pinion pushing device 18. As the energization of the pinion pushing device 18 is started, the pinion gear 17 is pushed out and then engages with the ring gear 16.

After that, the drive circuit 225 in the ECU 22 transmits a drive signal to the starter motor driving device 20, and then the power supply circuit for the starter motor 19 is closed; the battery 21 supplies electric power to the starter motor 19 so as to drive it; then, the rotation drive of the internal combustion engine 1 is started by the intermediary of the pinion gear 17 and the ring gear 16. As a result, the internal combustion engine 1 starts starting operation or restarting operation.

In the case where the restarting condition is satisfied while the internal combustion engine 1 inertially rotates after the internal combustion engine 1 has come into the automatic stopping mode, as describes later, a rotation speed calculation unit, formed of programming software, in the CPU 222 calculates a rotation speed Ne of the internal combustion engine 1, based on the detection signal from the crank angle sensor 13 and the like inputted to the ECU 22. Then, the drive signal based on the calculated rotation speed Ne is transmitted from the drive circuit 225 in the ECU 22 to the starter motor driving device 20 or to the pinion pushing device 18, so that the starter 15 is driven and the internal combustion engine 1 performs restarting operation.

Next, there will be explained the operation of the internal-combustion-engine automatic stop and restart system according to Embodiment 1 of the present invention.

Figure 2:
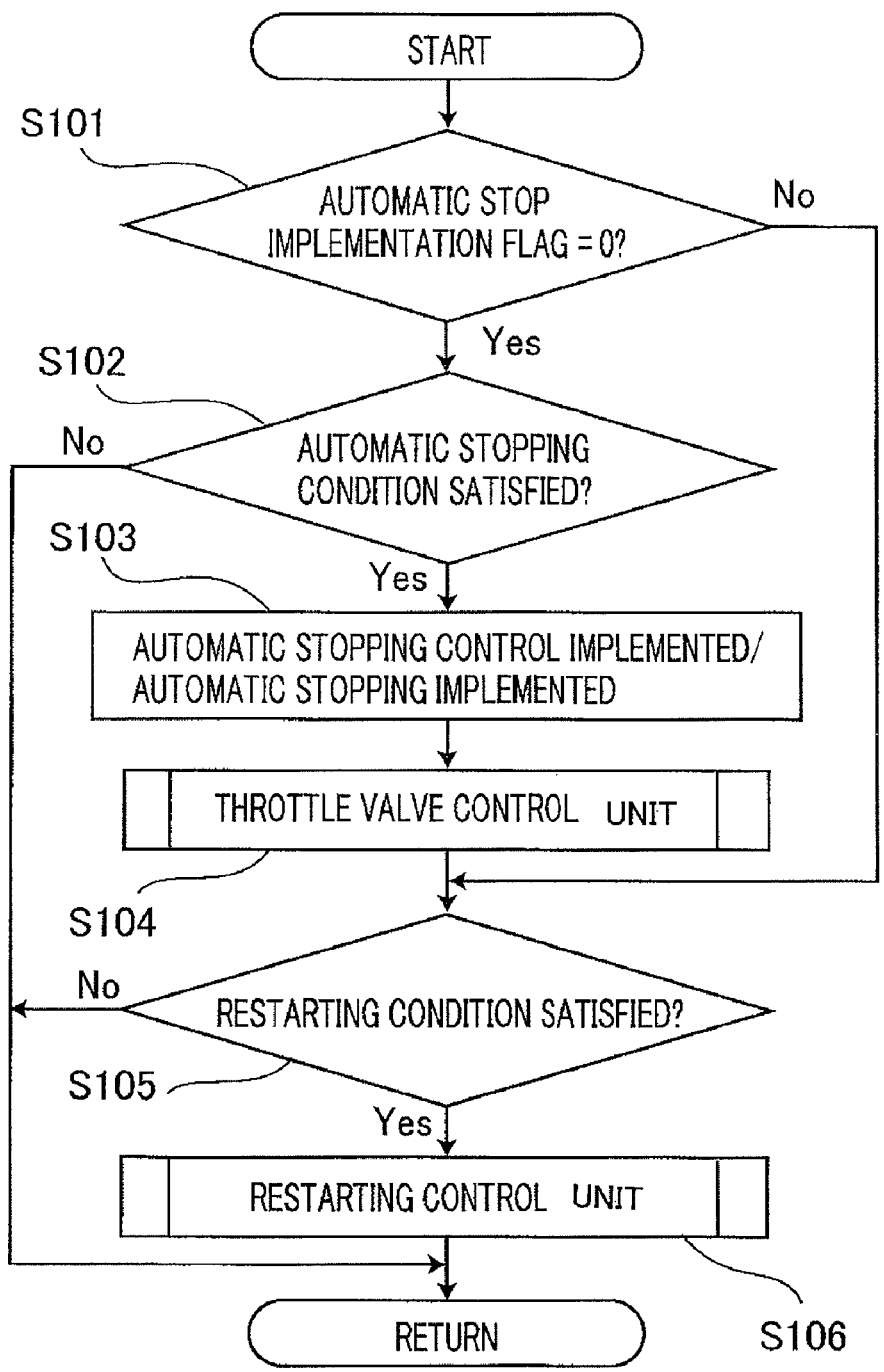
FIG. 2 is a flowchart representing the operation of an internal-combustion-engine automatic stop and restart system according to Embodiment 1 of the present invention.

FIG. 2 is a flowchart representing the operation of the internal-combustion-engine automatic stop and restart system according to Embodiment 1 of the present invention. In FIG. 2, firstly, it is determined in the step S101 whether or not there exists an automatic stop implementation flag that suggests that the internal combustion engine 1 has come into the automatic stopping mode. The automatic stop implementation flag is established when the automatic stopping is implemented in the step S103, described later; the automatic stop implementation flag becomes "1" when the automatic stopping has been implemented or when it is being implemented, and becomes "0" when the automatic stopping has not been implemented or when the internal combustion engine 1 restarts.

In the case where it is determined in the step S101 that the automatic stop implementation flag is not "0" (No), it is suggested that the internal combustion engine 1 is in the automatic stopping mode; therefore, the step S101 is followed by the step S105. In contrast, in the case where it is determined in the step S101 that the automatic stop implementation flag is "0" (Yes), it is suggested that the internal combustion engine 1 is not in the automatic stopping mode, i.e., it is in operation; therefore, the step S101 is followed by the step S102.

In the step S102, it is determined whether or not the automatic stopping condition has been satisfied. The determination whether or not the automatic stopping condition has been satisfied is implemented by collectively considering discrete automatic stopping conditions such as whether or not the temperature detected by the water temperature sensor is the same as or higher than a predetermined temperature (e.g., 60° C.), whether or not it has been detected that the vehicle speed had become the same as or higher than a predetermined speed (e.g., 10 [km/h]), whether or not the present vehicle speed is the same as or lower than a predetermined speed (e.g., 0 [km/h]), whether or not the brake pedal has been depressed, and whether or not the amount of depression of the accelerator pedal is the same as or larger than a predetermined value (e.g., no amount of depression).

In the case where it is determined in the step S102 that the automatic stopping condition has been satisfied (Yes), the automatic stopping condition is satisfied and hence the automatic stopping of the internal combustion engine 1 is made possible; thus, the step S102 is followed by the step S103. In contrast, in the case where it is determined in the step S102 that the automatic stopping condition has not been satisfied (No), at least one out of the discrete automatic stopping conditions is not satisfied, for example, the temperature detected by the water temperature sensor is the same as or lower than the predetermined temperature; therefore, the process is returned to the start.

In the case where it is determined in the step S102 that the automatic stopping condition has been satisfied and hence the step S102 is followed by the step S103, there is implemented automatic stopping control in which, for example, the drive signal to the fuel injection valve 12 from the drive circuit 225 in the ECU 22 is stopped so that the fuel supply to the internal combustion engine 1 is stopped. When the fuel supply from the fuel injection valve 12 is stopped, the internal combustion engine 1 cannot maintain the rotation speed Ne thereof that is calculated by the rotation speed calculation unit in the CPU 222 of the ECU 22, based on the detection signal from the crank angle sensor 13; therefore, the rotation speed of the internal combustion engine 1 decreases while the internal combustion engine 1 inertially rotates. Additionally, because the automatic stopping control has been implemented, the automatic stop implementation flag is set to "1".

Next, in the step S104, because the automatic stopping control has been implemented, the throttle valve control unit sets the opening degree of the throttle valve 6. The throttle valve control unit will be explained later.

After the throttle valve control unit sets the opening degree of the throttle valve in the step S104, the step S104 is followed by the step S105, where it is determined whether or not the restarting condition has been satisfied. The determination whether or not the restarting condition has been satisfied is implemented by collectively considering discrete restarting conditions such as whether or not the amount of depression of the brake pedal is the same as or smaller than a predetermined value (e.g., no amount of depression) and whether or not the amount of depression of the accelerator pedal is the same as or larger than a predetermined value (e.g., whether or not the amount of depression exceeds no amount of depression by more than 10%).

In the case where it is determined in the step S105 that the restarting condition has been satisfied (YES), the step S105 is followed by the step S106, where restarting control, described later, is implemented by the restarting control unit so as to restart the internal combustion engine 1. In contrast, in the case where it is determined in the step S105 that the restarting condition has not been satisfied (No), at least one discrete restarting condition is not satisfied, for example, the brake pedal is depressed and hence the restarting condition has not been satisfied; therefore, the process is returned to the start.

Figure 3:
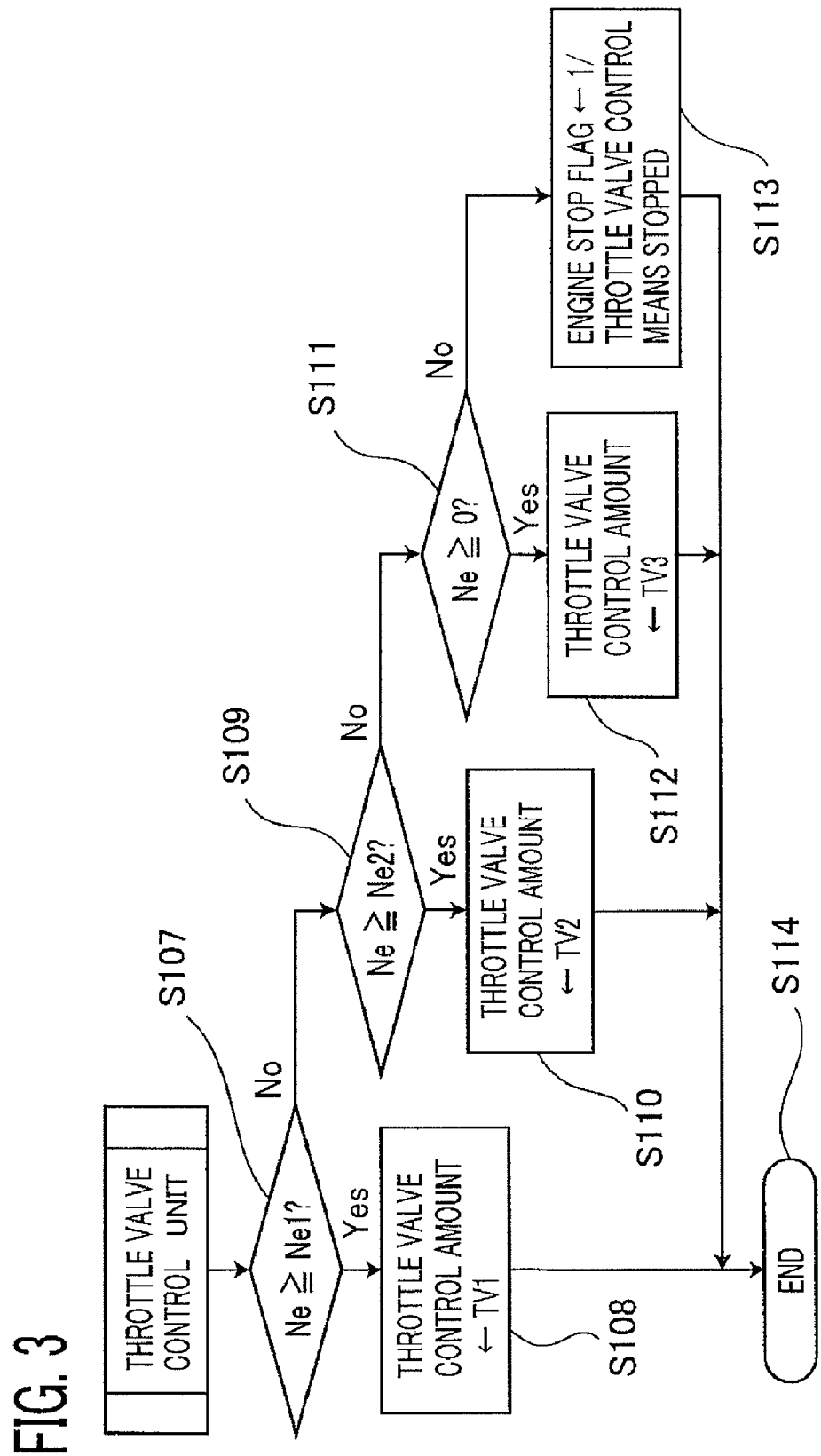
FIG. 3 is a flowchart representing the operation of a throttle valve control unit in an internal-combustion-engine automatic stop and restart system according to Embodiment 1 of the present invention.

The automatic stopping and restarting of the internal combustion engine 1 are implemented through the foregoing flow. Next, there will be explained the throttle valve control unit that is implemented in the step S104. FIG. 3 is a flowchart representing the operation of the throttle valve control unit in the internal-combustion-engine automatic stop and restart system according to Embodiment 1 of the present invention.

As described above, after the automatic stopping control of the internal combustion engine 1 is implemented in the step S103 represented in FIG. 2, the step S103 is followed by the step S104, where processing is implemented by the throttle valve control unit. The throttle valve control unit is formed of programming software in the CPU 222 of the ECU 22.

In FIG. 3, firstly, in the step S107, based on the detection signal from the crank angle sensor 13, there is read the rotation speed Ne of the internal combustion engine 1 calculated by the rotation speed calculation unit, formed of programming software, in the CPU 222 of the ECU 22; then, it is determined whether or not the rotation speed Ne of the internal combustion engine 1 is the same as or higher than a first predetermined rotation speed Ne1, which is a first predetermined value. Here, the first predetermined rotation speed Ne1 is set, for example, to 600 [r/min], as a rotation speed at which, when the internal combustion engine 1 is restarted, the restarting is made possible even only by fuel supply from the fuel injection valve 12.

The reason why the determination is implemented in the step S107 is that, when the internal combustion engine 1 that has come into the automatic stopping mode is restarted, it is not required that the starter drives the internal combustion engine 1 for the whole time period until the rotation speed Ne of the internal combustion engine 1 becomes "0", and there exists a time period during which the restarting of the internal combustion engine 1 can be completed even only through resumption of fuel supply, for example, in the case where the restarting condition is satisfied immediately after the internal combustion engine 1 comes into the automatic stopping mode. In other words, the determination is implemented in the step S107, because the lower limit rotation speed, at which the restarting of the internal combustion engine 1 can be performed even only through resumption of fuel supply, is Ne1, and it can be understood that the restarting operation, after the restarting condition has been satisfied, in a time period during which the rotation speed Ne1 of the internal combustion engine 1 is the same as or higher than the first predetermined rotation speed Ne1 is similar to the restoration from ordinary fuel cut control.

In the case where it is determined in the step S107 that the rotation speed Ne of the internal combustion engine 1 is the same as or higher than the first predetermined rotation speed Ne1 (Yes), the step S107 is followed by the step S108, where the amount of control of the throttle valve 6 is set to a first predetermined value TV1, which is, for example, the same amount of control of the throttle valve 6 as when the fuel cut control is performed; then, the step S108 is followed by the step S114, and the setting of the throttle valve 6 is ended. In the case where the result of the determination performed in the step S107 is "Yes", the rotation speed Ne is, as described above, a rotation speed at which the restarting of the internal combustion engine 1 can be implemented even only through resumption of fuel supply and hence it is not required that the pinion gear 17 engages with the ring gear 16; therefore, it does not pose any problem that the amount of control of the throttle valve 6 is set to an amount that is different from the amount at a time when the fuel cut control is performed.

In contrast, in the case where it is determined in the step S107 that the rotation speed Ne of the internal combustion engine 1 is lower than the first predetermined rotation speed Ne1 (No), the step S107 is followed by the step S109. In the step S109, the rotation speed Ne of the internal combustion engine 1 is compared with a second predetermined rotation speed Ne2, which is a second predetermined value, and then it is determined whether or not the rotation speed Ne of the internal combustion engine 1 is the same as or higher than the second predetermined rotation speed Ne2. When the step S107 is followed by the step S109, the rotation speed Ne of the internal combustion engine 1 is lower than the first predetermined rotation speed Ne1. That is to say, the rotation speed Ne has become equal to a rotation speed at which it is not made possible that the restarting of the internal combustion engine 1 is performed even only through resumption of fuel supply; therefore, it is required that the internal combustion engine 1 is accelerated by the starter 15 when the internal combustion engine 1 is restarted. Therefore, it is required to make the pinion gear 17 engage with the ring gear 16; thus, it is not preferable that there occurs fluctuation in the rotation speed of the internal combustion engine 1. Accordingly, it is required to set an amount of control of the throttle valve 6, which is different from the amount of control set in the step S108; for that purpose, the determination in the step S109 is implemented. The second predetermined rotation speed Ne2 is set, for example, to 100 [r/min].

In the case where it is determined in the step S109 that the rotation speed Ne of the internal combustion engine 1 is the same as or higher than the second predetermined rotation speed Ne2 (Yes), the step S109 is followed by the step S110, where the amount of control of the throttle valve 6 is set to a second predetermined value TV2, which is, for example, a value corresponding to "full open"; then, the step S110 is followed by the step S114, and the setting of the throttle valve 6 is ended. In contrast, in the case where it is determined in the step S109 that the rotation speed Ne of the internal combustion engine 1 is lower than the second predetermined rotation speed Ne2 (No), the step S109 is followed by the step S111.

In the step S111, it is determined whether or not the internal combustion engine 1 is rotating, i.e., the rotation speed Ne of the internal combustion engine 1 has exceeded "0". In the case where the internal combustion engine 1 has stopped, there exists no fluctuation in the rotation speed of the internal combustion engine 1; thus, the throttle valve control unit is not required to control the throttle valve 6. Accordingly, in the case where it is determined in the step S111 that the rotation speed Ne of the internal combustion engine 1 has not exceeded "0", i.e., it is determined that the internal combustion engine 1 is in the stopping mode (No), the step S111 is followed by the step S113, where an internal combustion engine stop flag is set to "1" and the throttle valve control unit is stopped so that the amount of control of the throttle valve 6 is set to the reference value; then, the step S113 is followed by the step S114, and the processing is ended.

The internal combustion engine stop flag is a flag that is set only when the internal combustion engine 1 is in the automatic stopping mode and the rotation thereof is stopped; in the case where, even after the internal combustion engine 1 has come into the automatic stopping mode, the internal combustion engine stop flag is set not to "1" but to "0". In contrast, in the case where, although its rotation speed is low, the internal combustion engine 1 is still rotating, the result of the determination in the step S111 becomes "Yes"; thus, the step S111 is followed by the step S112.

In the step S112, the amount of control of the throttle valve 6 is set to a third predetermined value TV3. At this stage, the rotation speed Ne of the internal combustion engine 1 is given by [0<Ne<Ne2]; it suggests that the throttle valve control unit has been controlling the throttle valve 6 after the internal combustion engine 1 came into the automatic stopping mode. When the restarting condition is satisfied under this condition, there may be caused a combustion failure, because air to be supplied to the internal combustion engine 1 becomes too little when the internal combustion engine 1 is restarted.

Thus, unlike the settings in the steps S108 and S110, the amount of control of the throttle valve 6 is set to a large amount of control in the step S112. This control makes it possible to perform rapid restarting without causing any combustion failure when the internal combustion engine 1 is restarted. The rotation speed Ne of the internal combustion engine 1 at this stage is low and hence the pinion gear 17 can engage with the ring gear 16, even when the starter motor driving device 20 does not drive the starter motor 19, and because the rotation speed Ne of the internal combustion engine 1 is low, there is caused no fluctuation, in the rotation speed of the internal combustion engine 1, that makes the driver sense discomfort, even if the throttle valve is opened.

As described above, in accordance with the rotation speed Ne of the internal combustion engine 1, the throttle valve control unit sets the amount of control of the throttle valve 6 after the internal combustion engine 1 comes into the automatic stopping mode.

Figure 4:
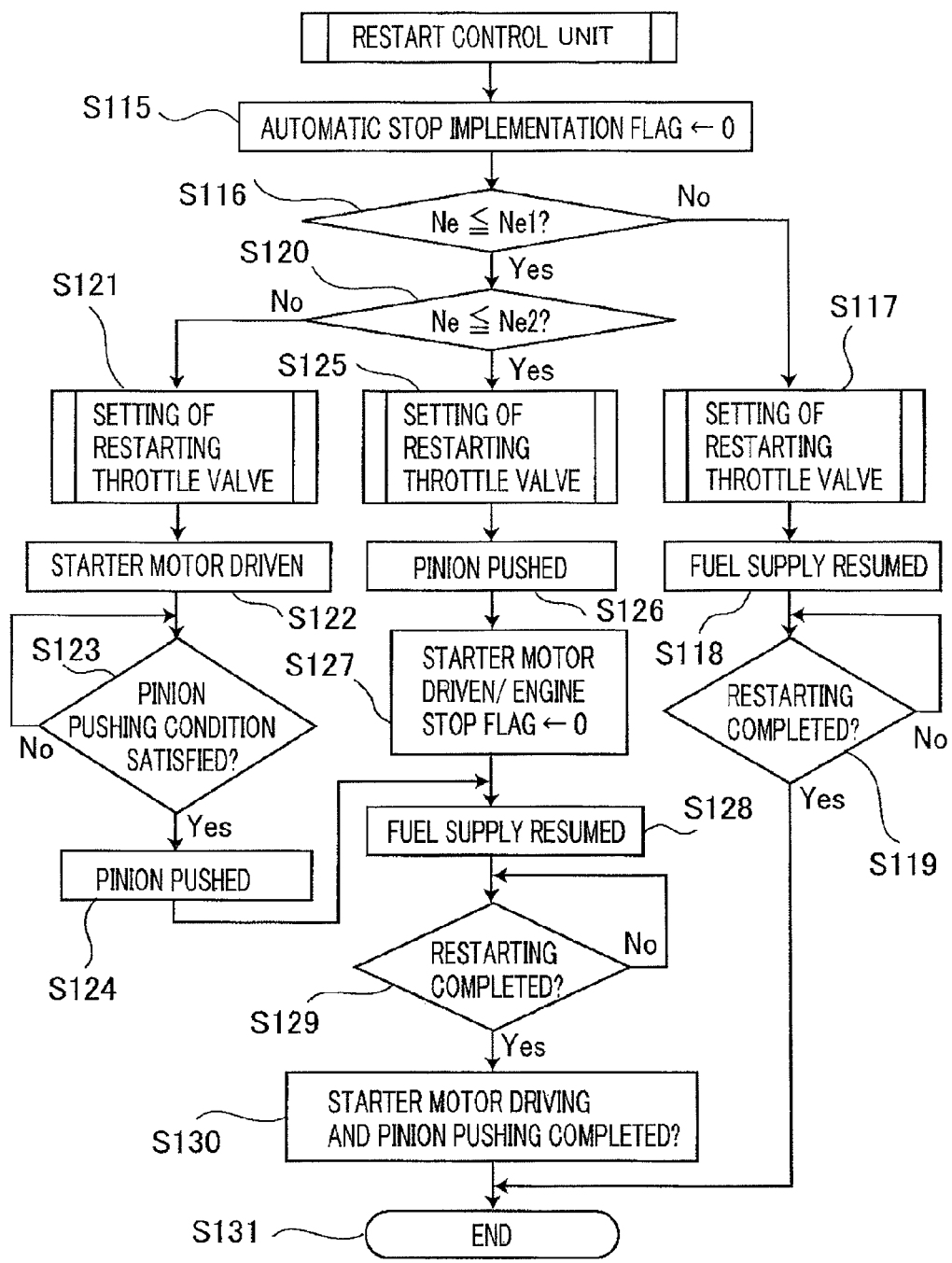
FIG. 4 is a flowchart representing the operation of a restarting control unit in an internal-combustion-engine automatic stop and restart system according to Embodiment 1 of the present invention.

Next, there will be explained the restarting control unit performed in the step S106 represented in FIG. 2. FIG. 4 is a flowchart representing the operation of the restarting control unit in the internal-combustion-engine automatic stop and restart system according to Embodiment 1 of the present invention.

In the case where it is determined in the step S105 in FIG. 2 that the restarting control has been satisfied and then the restarting control unit is implemented in the step S106, firstly, the automatic stop implementation flag is set to "0" in the step S115 in FIG. 4. Then, the step S115 is followed by the step S116, where it is determined whether or not the rotation speed Ne of the internal combustion engine 1 at a time when the restarting condition has satisfied is the same as or lower than the first predetermined rotation speed Ne1.

In the step S116, as described above, it is determined whether or not the internal combustion engine 1 is restarted even only through resumption of fuel supply; in the case where it is determined that the rotation speed Ne of the internal combustion engine 1 is higher than the first predetermined rotation speed Ne1 (No), the step S116 is followed by the step S117, where there is performed restart throttle valve setting in which the amount of control of the throttle valve 6, which has been set by the throttle valve control unit, is set to an amount corresponding to the restarting opening degree.

Here, the restart throttle valve setting will be explained. By controlling the throttle valve 6 through the throttle valve control unit after the internal combustion engine 1 has come into the automatic stopping mode, fluctuation in the rotation speed can be suppressed while the internal combustion engine 1 inertially rotates. However, in the case where, after the restarting condition is satisfied while the internal combustion engine 1 inertially rotates, the restarting operation is performed, air to be supplied to the internal combustion engine 1 may become too little when the restarting operation is performed, because the throttle valve 6 has been controlled, whereby a combustion failure may be caused. Accordingly, in the steps S117, S121, and S125, the restart throttle valve setting is implemented so that air to be supplied is prevented from becoming too little when the internal combustion engine 1 is restarted.

Figure 5:
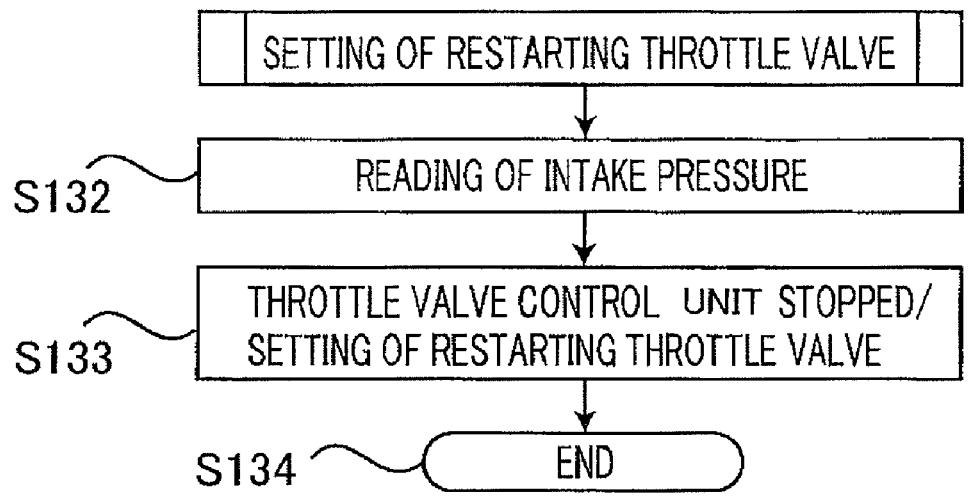
FIG. 5 is a flowchart representing restart throttle valve setting operation in an internal-combustion-engine automatic stop and restart system according to Embodiment 1 of the present invention.

FIG. 5 is a flowchart representing the restart throttle valve setting operation in the internal-combustion-engine automatic stop and restart system according to Embodiment 1 of the present invention. In FIG. 5, when the processing of the restart throttle valve setting is started, firstly, an intake-pressure detection pressure from the intake pressure sensor 8 is read in the step S132. Next, in the step S133, by utilizing the relationship, to be preliminarily stored in the ROM 223 in the ECU 22, between the intake pressure and the amount of control of the throttle valve 6 at a time of restarting, there is calculated the amount of control of the throttle valve 6 corresponding to the intake pressure at a time of restarting; the operation of the throttle valve control unit is stopped, and the amount of control of the throttle valve 6 is set to the calculated restarting throttle valve control amount; then, the step S133 is followed by the step S134, where the process is ended.

Figure 7:
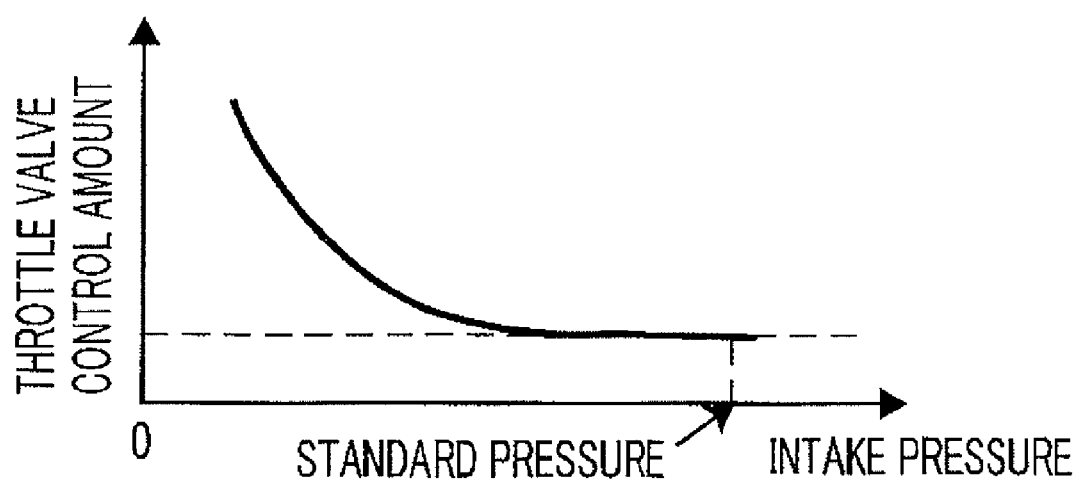
FIG. 7 is an explanatory graph representing the relationship between the throttle valve and the intake pressure in an internal-combustion-engine automatic stop and restart system according to Embodiment 1 of the present invention.

FIG. 7 is an explanatory graph representing the relationship between the throttle valve and the intake pressure in the internal-combustion-engine automatic stop and restart system according to Embodiment 1 of the present invention; the relationship between the throttle valve and the intake pressure, which is preliminarily stored in the ROM 223, is utilized to calculate, in the step S133, the amount of control of the throttle valve 6 corresponding to the intake pressure at a time of restarting.

In the case where it is determined in the step S116 that the rotation speed Ne of the internal combustion engine 1 is higher than the first predetermined rotation speed Ne1 (No), the step S116 is followed by the step S117; after the foregoing restart throttle valve setting is completed in the step S117, the step S117 is followed by the step S118, where fuel supply through the fuel injection valve 12 is resumed. Then, in the step S119, it is determined whether or not the restarting has been completed. Whether or not the restarting has been completed is determined collectively based on, for example, the change in the rotation speed Ne of the internal combustion engine 1. In the case where it is determined in the step S119 that the restarting has not been completed (No), the step S119 is repeated. In contrast, in the case where it is determined in the step S119 that the restarting has been completed (Yes), the step S119 is followed by the step S131, where the operation of the restarting control unit is ended.

In the case where it is determined in the step S116 that the rotation speed Ne of the internal combustion engine 1 is the same as or lower than the first predetermined rotation speed Ne1 (Yes), the step S116 is followed by the step S120; at this time, it is determined whether or not the rotation speed Ne of the internal combustion engine 1 is the same as or lower than the second predetermined rotation speed Ne2. When the step S116 is followed by the step S120, it suggests that the rotation speed Ne of the internal combustion engine 1 is the same as or lower than the first predetermined rotation speed Ne1. That is to say, the rotation speed Ne has become equal to a rotation speed at which it is not made possible that the restarting of the internal combustion engine 1 is performed even only through resumption of fuel supply; therefore, it is required that the internal combustion engine 1 is accelerated by the starter 15 when the internal combustion engine 1 is restarted. Furthermore, it is required to determine, from the rotation speed Ne of the internal combustion engine 1, which one of the starter motor driving device 20 and the pinion pushing device 18 in the starter 15 is to drive.

In the case where it is determined in the step S120 that the rotation speed Ne of the internal combustion engine 1 is higher than the second predetermined rotation speed Ne2 (No), the step S120 is firstly followed by the step S121, where the restarting throttle valve setting is performed, i.e., the amount of control of the throttle valve 6 is set to the restarting throttle valve control amount; next, the step S121 is followed by the step S122.

Figure 6:
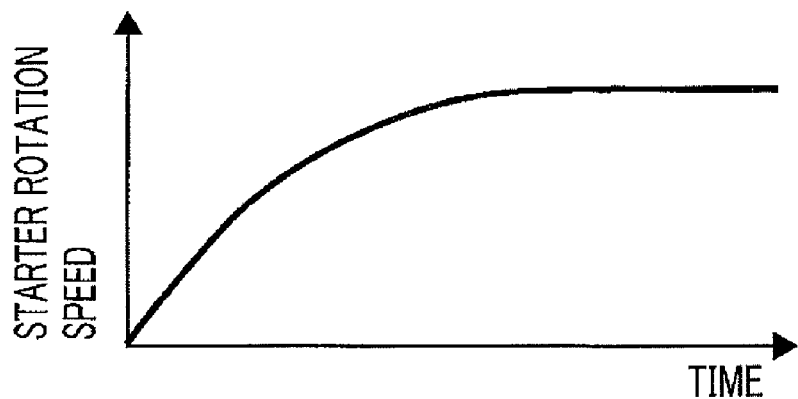
FIG. 6 is a characteristic graph representing the rotation speed characteristics of a starter motor in an internal-combustion-engine automatic stop and restart system according to Embodiment 1 of the present invention.

The rotation speed Ne of the internal combustion engine 1 is higher than the second predetermined rotation speed Ne2; thus, when the starter motor 19 is firstly driven by the starter motor driving device 20 in the step S122, the pinion gear 17 starts to rotate. In this situation, because the pinion gear 17 is not engaged with the ring great 16 and hence driven with no load imposed on it; therefore, the rotation speed rises along the motor rotation speed characteristics represented in FIG. 6, as the time elapses. FIG. 6 is a characteristic graph representing the rotation speed characteristics of the starter motor in the internal-combustion-engine automatic stop and restart system according to Embodiment 1 of the present invention.

Next, the step S122 is followed by the step S123, where it is determined whether or not the operation condition for the pinion pushing device 18 has been satisfied. In the step S122, while the starter motor 19 is driven by the starter motor driving device 20 and the pinion gear 17 rotates, the rotation speed Ne of the internal combustion engine 1 decreases as the internal combustion engine 1, which has come into the automatic stopping mode, inertially rotates; therefore, the rotation speed of the pinion gear 17 coincides with the rotation speed Ne of the internal combustion engine 1 after a predetermined time has elapsed. The determination about whether or not the operation condition for the pinion pushing device 18 has been satisfied is performed by determining whether or not the predetermined time has elapsed.

In the case where it is determined in the step S123 that the operation condition for the pinion pushing device 18 has not been satisfied (No), there has not elapsed the predetermined time in which the rotation speed of the pinion gear 17 coincides with the rotation speed Ne of the internal combustion engine 1; thus, the step S123 is repeated. In contrast, in the case where it is determined in the step S123 that the operation condition for the pinion pushing device 18 has been satisfied (Yes), there has elapsed the predetermined time in which the rotation speed of the pinion gear 17 coincides with the rotation speed Ne of the internal combustion engine 1; thus, the step S123 is followed by the step S124, where the pinion gear 17 is pushed out by the pinion pushing device 18 so as to engage with the ring gear 16.

The step S124 is followed by the step S128, where fuel supply through the fuel injection valve 12 is resumed; then, it is determined in the step S129 whether or not the restarting has been completed. In the case where it is determined in the step S129 that the restarting has been completed (YES), the step S129 is followed by the step S130; in the case where it is determined that the restarting has not been completed (No), the step S129 is repeated until the restarting is completed. When the restarting is completed, the step S129 is followed by the step S130, where the driving operations of the starter motor driving device 20 and the pinion pushing device 18 are stopped; then, the step S130 is followed by the step S131, where the processing by the restarting control unit is ended.

In the case where it is determined in the step S120 that the rotation speed Ne of the internal combustion engine 1 is the same as or lower than the second predetermined rotation speed Ne2 (Yes), it suggests that the rotation speed Ne of the internal combustion engine 1 is low and hence the pinion gear 17 can engage with the ring gear 16, even when the starter motor driving device 20 does not drive the starter motor 19 first. The step S120 is followed by the step S125, where the amount of control of the throttle valve 6 that has been set by the throttle valve control unit is set to the foregoing restarting throttle valve control amount, as the restart throttle valve setting; then, the step S125 is followed by the step S126.

In the step S126, the pinion gear 17 is pushed out by the pinion pushing device 18 so as to engage with the ring gear 16. Then, in the step S127, the starter motor 19 is driven by the starter motor driving device 20 so as to make the pinion gear 17 start to rotate, so that the acceleration of the internal combustion engine 1 is started by the intermediary of the ring gear 16. In the case where the internal combustion engine stop flag has been set to "1", i.e., in the case where the internal combustion engine stop flag has been set at a time of restarting after the rotation of the internal combustion engine 1 stopped, the internal combustion engine stop flag is set to "0" in the step S127, and then, the step S127 is followed by the step S128.

Then, as describes above, fuel supply through the fuel injection valve 12 is resumed in the step S128, and in the step S129, it is determined whether or not restarting has been completed; in the case where it is determined in the step S129 that the restarting has been completed (Yes), the step S129 is followed by the step S130, where driving of the starter motor driving device 20 and the starter motor 19 is ended, so that the processing by the restarting control unit is completed.

Figure 8:
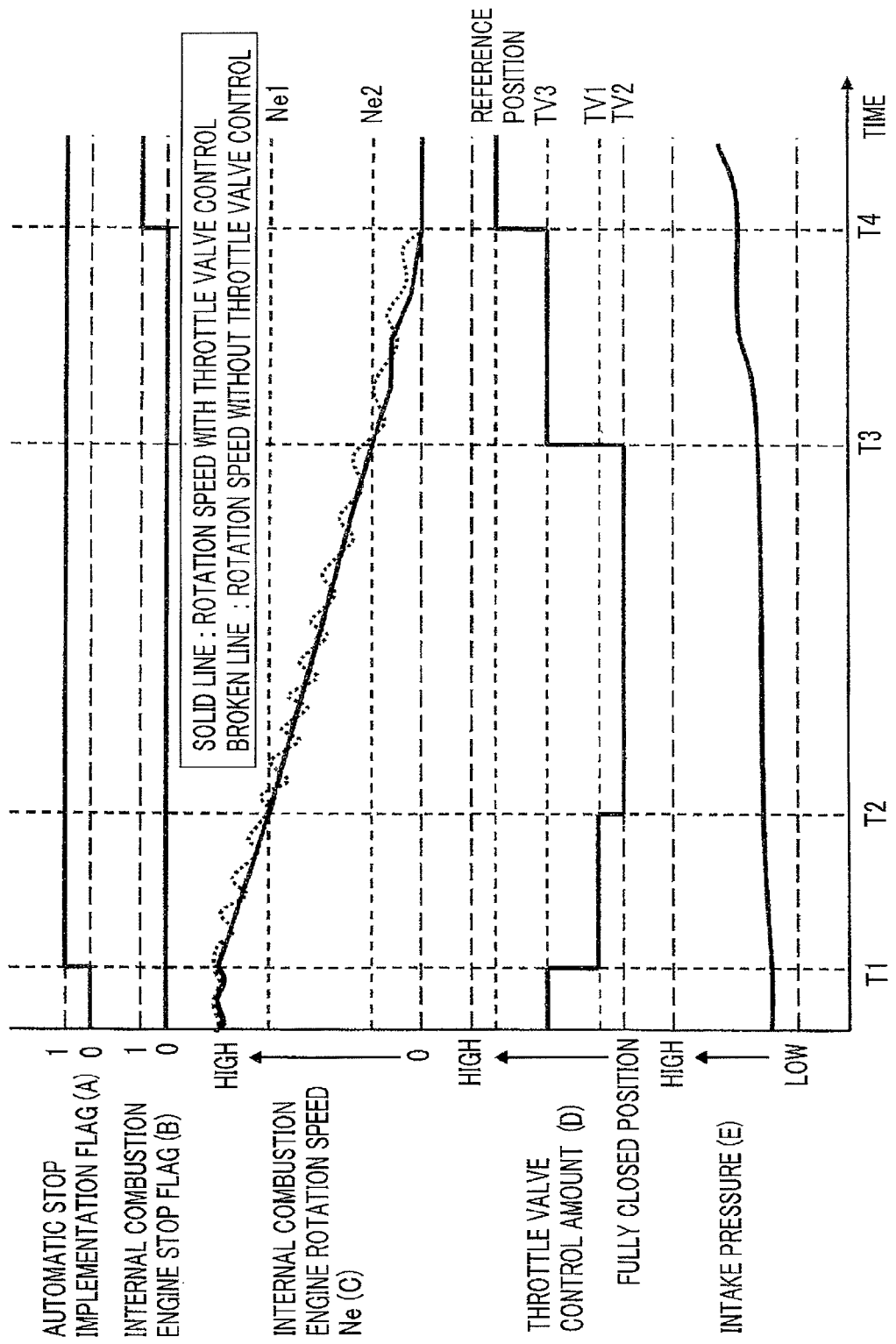
FIG. 8 is a timing chart representing the status of an internal combustion engine after the combustion engine has come into the automatic stopping mode in an internal-combustion-engine automatic stop and restart system according to Embodiment 1 of the present invention.

Next, with regard to the internal-combustion-engine automatic stop and restart system, described above, according to Embodiment 1 of the present invention, there will be explained the operation of the throttle valve 6 at a time when the internal combustion engine is in the automatic stopping mode. FIG. 8 is a timing chart representing the status of an internal combustion engine after the combustion engine has come into the automatic stopping mode in the internal-combustion-engine automatic stop and restart system according to Embodiment 1 of the present invention; the automatic stop implementation flag (A), the engine stop flag (B), the internal combustion engine rotation speed Ne (C), the throttle valve control amount (D), and the intake pressure (E) are represented. In the chart (C) of the internal combustion engine rotation speed Ne, the solid line represents the rotation speed with the throttle valve control; the broken line represents the rotation speed without the throttle valve control.

In FIG. 8, at first, when the automatic stopping condition for the internal combustion engine 1 is satisfied at a time instant T1, there is implemented automatic stopping control in which, for example, fuel supply through the fuel injection valve 12 is stopped, and then the automatic stop implementation flag is set to "1". Because the automatic stopping condition is satisfied and the automatic stopping control is implemented, the internal combustion engine rotation speed Ne (C) decreases while the internal combustion engine 1 inertially rotates. In the time period from the time instant T1 to a time instant T2 after the automatic stopping condition has been satisfied, i.e., until the internal combustion engine rotation speed Ne (C) becomes equal to the first predetermined rotation speed Ne1, it is made possible to restart the internal combustion engine 1 even only through resumption of fuel supply; therefore, the throttle valve control unit sets the throttle valve control amount (D) to the first predetermined value TV1.

Because the throttle valve control amount (D) is set to the first predetermined value TV1, the internal combustion engine rotation speed Ne (C) decreases in such a way that fluctuation in the rotation speed is suppressed as represented by the solid line from the time instant T1 to the time instant T2. However, in the case where the throttle valve control unit is not provided, the internal combustion engine rotation speed Ne (C) decreases while fluctuating periodically in the rotation speed, as represented by the broken line.

After the time instant T2, i.e., when becoming lower than the first predetermined rotation speed Ne1, the internal combustion engine rotation speed Ne (C) reaches a rotation speed at which it is difficult to restart the internal combustion engine 1 without acceleration by the starter 15. In addition, because the inertial force of the internal combustion engine 1 is low, the fluctuation in the rotation speed becomes large. Accordingly, in the time period from the time instant T2 to a time instant T3, i.e., in the time period during which the internal combustion engine rotation speed Ne (C) falls between the first predetermined rotation speed Ne1 and the second predetermined rotation speed Ne2, the throttle valve control amount (D) is set to the second predetermined value TV2, which is smaller than the first predetermined value TV1. Because the throttle valve control amount (D) is set to the second predetermined value TV2, which is smaller than the first predetermined value TV1, the fluctuation in the internal combustion engine rotation speed Ne (C) can be suppressed; therefore, as represented by the solid line, the internal combustion engine rotation speed Ne (C) decreases without being fluctuated largely.

After the time instant T3, i.e., when the internal combustion engine rotation speed Ne (C) becomes lower than the second predetermined rotation speed Ne2, the throttle valve control amount (D) is increased from the second predetermined value TV2 to the third predetermined value TV3 in a time period from the time instant T3 to a time instant T4. By increasing the throttle valve control amount (D), no combustion failure is caused when the internal combustion engine 1 is restarted, even when the restarting condition is satisfied in the time period from the time instant T3 to the time instant T4.

After the time instant T4, the rotation speed Ne (C) of the internal combustion engine 1 is "0", i.e., the internal combustion engine 1 is in the stopping mode; thus, no fluctuation in the rotation speed is caused. Accordingly, it is not required that the throttle valve control unit control the amount of control of the throttle valve 6; thus, the throttle valve control amount (D) is set to the reference value (reference position), and the operation of the throttle valve control unit is ended; because the rotation of the internal combustion engine 1 is stopped, the internal combustion engine stop flag (B) changes from "0" to "1".

Figure 9:
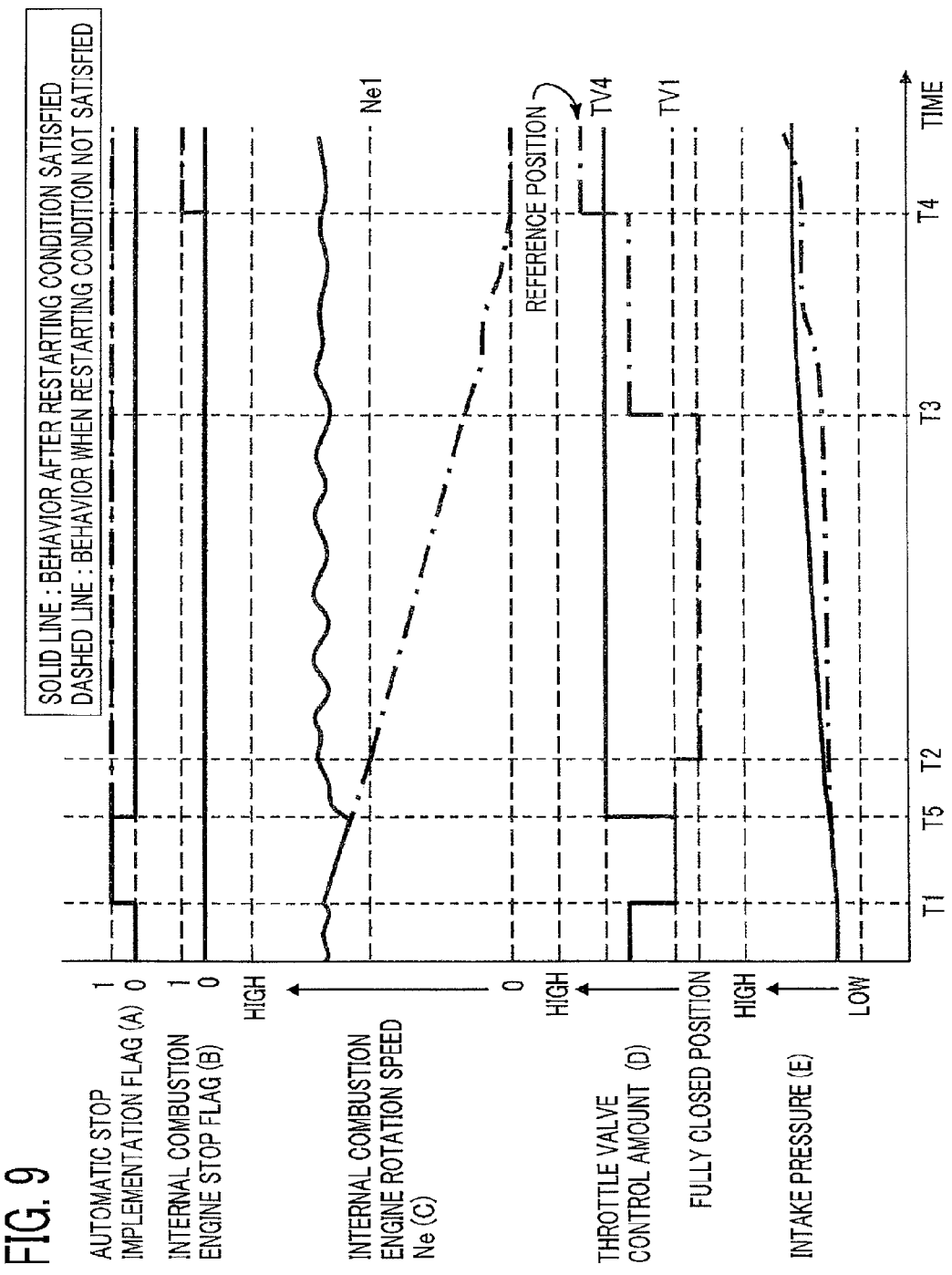
FIG. 9 is a timing chart representing the status of an internal combustion engine at a time when restart control is performed while the rotation speed of the internal combustion engine is high and the starter does not drive, in an internal-combustion-engine automatic stop and restart system according to Embodiment 1 of the present invention.

Next, with reference to a timing chart, there will be explained the processing performed by the restarting control unit configured in the CPU 222 of the ECU 22. At first, FIG. 9 will be explained. FIG. 9 is a timing chart representing the status of the internal combustion engine at a time when the restart control is performed while the rotation speed of the internal combustion engine is high and the starter does not drive, in the internal-combustion-engine automatic stop and restart system according to Embodiment 1 of the present invention; there is represented a case where the restarting condition is satisfied by a time instant T2. FIG. 9 represents a case where, after the automatic stopping condition has been satisfied, the restarting of the internal combustion engine 1 is completed even only through resumption of fuel supply through the fuel injection valve 12.

In FIG. 9, when the automatic stopping condition is satisfied at a time instant T1, fuel supply through the fuel injection valve 12 is stopped and the automatic stop implementation flag (A) changes from "0" to "1"; concurrently, the throttle valve control amount (D) is set to the first predetermined value TV1.

Because fuel supply through the fuel injection valve 12 is stopped, the internal combustion engine rotation speed Ne (C) decreases; however, when, due to the operation of the driver, the restarting condition is satisfied at a time instant T5 before the time instant T2, the automatic stop implementation flag (A) changes from "1" to "0"; concurrently, the operation of the throttle valve control unit is stopped, and the throttle valve control amount (D) is set to a fourth predetermined value TV4 calculated from the data represented in FIG. 7, based on the intake pressure (E) of the internal combustion engine 1.

While these control items are performed, fuel supply through the fuel injection valve 12 is also resumed, so that combustion in the internal combustion engine 1 is resumed, whereby the restarting of the internal combustion engine 1 is completed. As represented in FIG. 9, in the case where the restarting condition is satisfied in the time period from the time instant T1 to the time instant T2, the restarting of the internal combustion engine 1 is completed even only by resumption of fuel supply through the fuel injection valve 12, even when no acceleration is performed by the starter 15; therefore, the starter 15 does not drive. In addition, because the internal combustion engine 1 is restarted without stopping its rotation, the internal combustion engine stop flag is kept "0".

Figure 10:
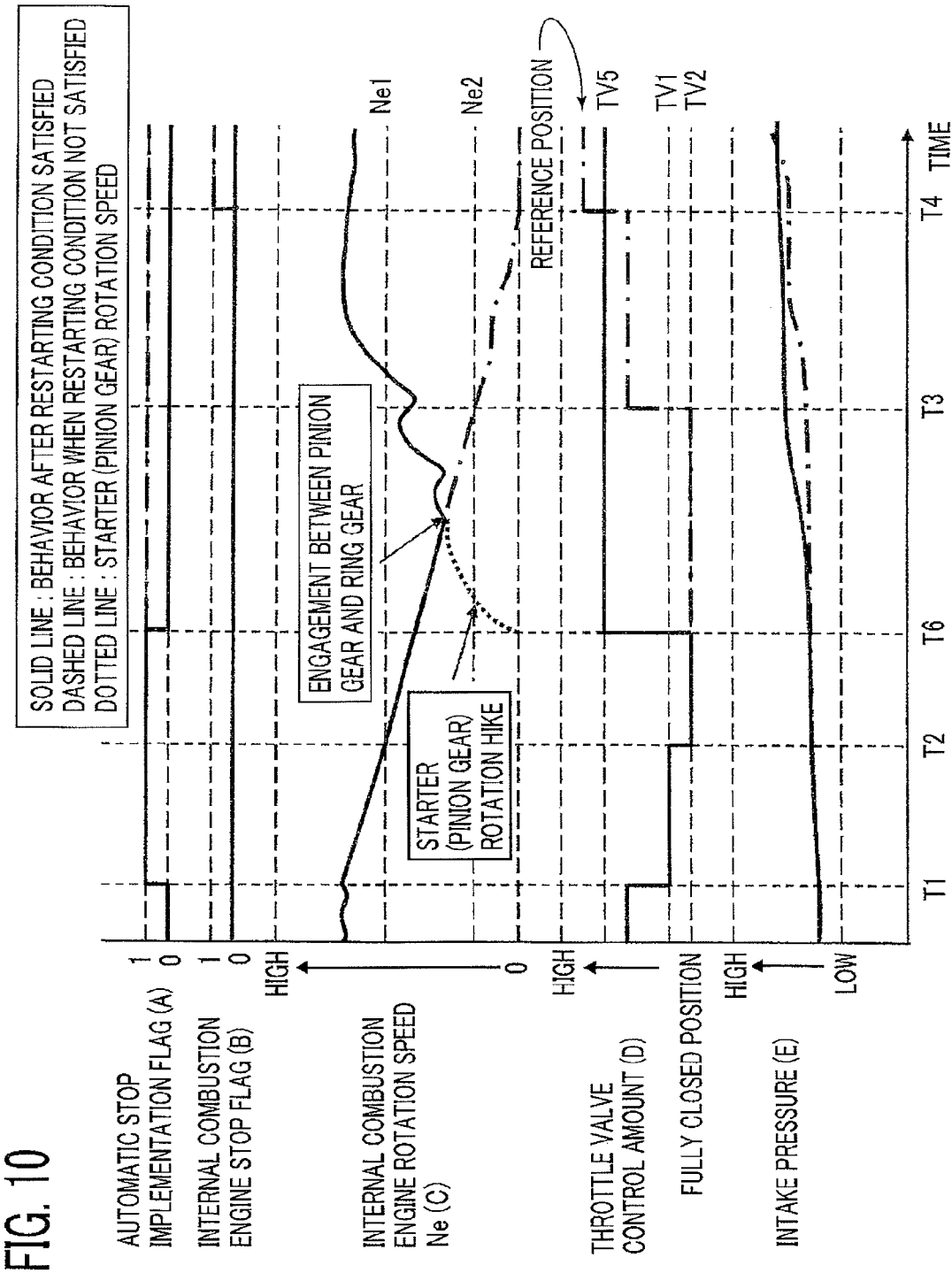
FIG. 10 is a timing chart representing the status of an internal combustion engine at a time when restart control is performed while the rotation speed of the internal combustion engine is high and the starter drives, in an internal-combustion-engine automatic stop and restart system according to Embodiment 1 of the present invention.

Next, FIG. 10 will be explained. FIG. 10 is a timing chart representing the status of the internal combustion engine at a time when the restart control is performed while the rotation speed of the internal combustion engine is high and the starter drives, in the internal-combustion-engine automatic stop and restart system according to Embodiment 1 of the present invention; there is represented a case where the restarting condition is satisfied in the time period from a time instant T2 to a time instant T3. FIG. 10 is a timing chart representing the restarting of the internal combustion engine 1 in the case where acceleration is performed by the starter 15; there is represented a case where the restarting condition is satisfied when the rotation speed Ne of the internal combustion engine 1 is high.

In FIG. 10, when the restarting condition is satisfied at a time instant T1, the automatic stop implementation flag (A) changes from "0" to "1"; concurrently, fuel supply through the fuel injection valve 12 is stopped. Additionally, the throttle valve control unit sets the throttle valve control amount (D) to the first predetermined value TV1. The internal combustion engine rotation speed Ne (C) decreases; then, at a time instant T2, i.e., when the internal combustion engine rotation speed Ne (C) becomes lower than the first predetermined rotation speed Ne1, the throttle valve control unit changes the setting of the throttle valve control amount (D) from the first predetermined value TV1 to the second predetermined value TV2.

After that, when, due to the operation of the driver, the restarting condition is satisfied at a time instant T6 between the time instant T2 and a time instant T3, the automatic stop implementation flag (A) changes from "1" to "0"; the throttle valve control unit is stopped; and the throttle valve control amount (D) is set to a fifth predetermined value TV5 calculated from the data represented in FIG. 7, based on the intake pressure (E) of the internal combustion engine 1.

In the case where the restarting condition is satisfied at a time instant between the time instant T2 and the time instant T3, the starter needs to perform acceleration in order to restart the internal combustion engine 1; however, because the internal combustion engine rotation speed Ne (C) is high, the starter motor 19 is firstly driven by the starter motor driving device 20, and then the pinion gear 17 starts to rotate, as represented by the broken line in FIG. 10. The rotation speed of the pinion gear 17 increases as the characteristics represented in FIG. 6; on the other hand, the internal combustion engine rotation speed Ne (C) decreases while inertially rotating; thus, when a predetermined time elapses after the pinion gear 17 has started to rotate, the rotation speed of the pinion gear 17 and the internal combustion engine rotation speed Ne (C) coincide with each other.

At the timing when the rotation speed of the pinion gear 17 and the internal combustion engine rotation speed Ne (C) coincide with each other, the pinion gear 17 is pushed out by the pinion pushing device 18 so as to engage with the ring gear 16, so that the starter motor 19 of the starter 15 drives and accelerates the internal combustion engine 1. At the same time, fuel supply through the fuel injection valve 12 is resumed and hence the combustion in the internal combustion engine 1 is resumed, so that the restarting of the internal combustion engine 1, which has been driven and accelerated by the starter 15, is completed. In addition, in FIG. 10, because the restarting condition is satisfied by the time the internal combustion engine 1 is stopped, the internal combustion engine stop flag (B) is kept "0".

Figure 11:
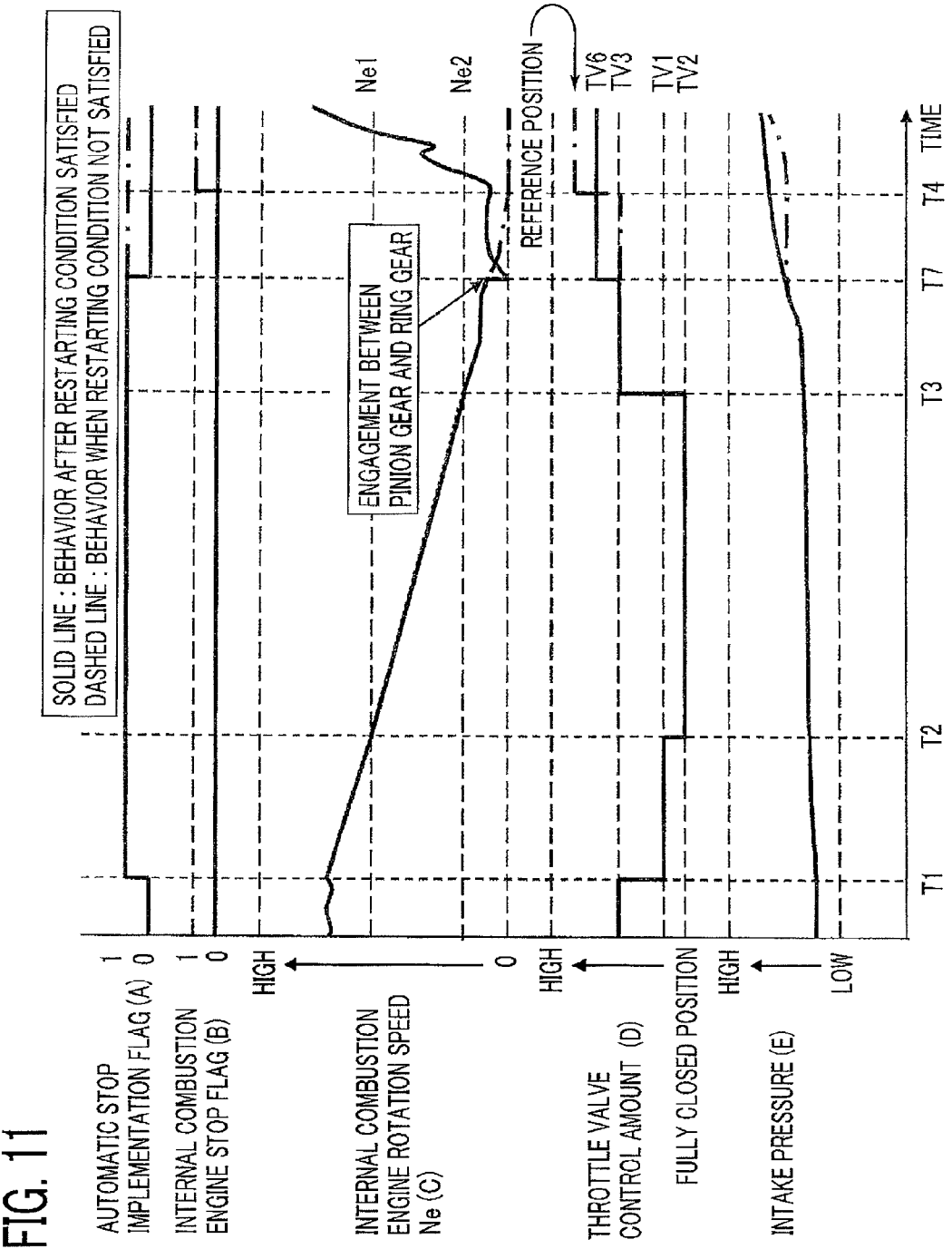
FIG. 11 is a timing chart representing the status of an internal combustion engine at a time when restart control is performed while the rotation speed of the internal combustion engine is low, in an internal-combustion-engine automatic stop and restart system according to Embodiment 1 of the present invention.

Next, FIG. 11 will be explained. FIG. 11 is a timing chart representing the status of the internal combustion engine at a time when restart control is performed while the rotation speed of the internal combustion engine is low, in the internal-combustion-engine automatic stop and restart system according to Embodiment 1 of the present invention; there is represented a case where the restarting condition is satisfied in the time period from a time instant T3 to a time instant T4. In FIGS. 9 through 11, the solid line represents the behavior of each item in the case where the restarting condition is satisfied; the dashed line represents the behavior of each item in the case where the restarting condition is not satisfied while the internal combustion engine rotation speed Ne (C) decreases as represented in FIG. 8. FIG. 11 also represents a case where the internal combustion engine 1 is accelerated by the starter 15; there is represented a timing chart of restarting in the case where the restarting condition is satisfied when the rotation speed Ne of the internal combustion engine 1 is low.

In FIG. 11, when the restarting condition is satisfied at a time instant T1, fuel supply through the fuel injection valve 12 is stopped and the automatic stop implementation flag (A) changes from "0" to "1"; concurrently, the throttle valve control unit sets the throttle valve control amount (D) to the first predetermined value TV1. After that, the internal combustion engine rotation speed Ne (C) decreases; then, at a time instant T2, i.e., when the internal combustion engine rotation speed Ne (C) becomes lower than the first predetermined rotation speed Ne1, the setting of the throttle valve control amount (D) is changed from the first predetermined value TV1 to the second predetermined value TV2. At the time instant T3, i.e., when the internal combustion engine rotation speed Ne (C) becomes lower than the second predetermined rotation speed Ne2, the throttle valve control amount (D) is changed from the second predetermined value TV2 to the third predetermined value TV3.

When the restarting condition is satisfied at a time instant T7 after the time instant T3, the automatic stop implementation flag (A) changes from "1" to "0"; concurrently, the operation of the throttle valve control unit is stopped, and the throttle valve control amount (D) is set to a sixth predetermined value TV6 calculated from the data represented in FIG.

7, based on the intake pressure (E) of the internal combustion engine 1. Additionally, the pinion pushing device 18 pushes out the pinion gear 17.

In the case where the internal combustion engine rotation speed Ne is lower than the second predetermined rotation speed Ne2, the pinion gear 17 can engage with the ring gear 16, even when the starter motor driving device 20 does not drive the starter motor 19; thus, firstly, the pinion pushing device 18 is made to drive. After the pinion gear 17 engages with the ring gear 16, the starter motor driving device 20 drives the starter motor 19, so that, by the intermediary of the pinion gear 17 and the ring gear 16, the internal combustion engine 1 is driven and accelerated by the starter 15. While the internal combustion engine 1 is accelerated, fuel supply through the fuel injection valve 12 is resumed and hence the combustion in the internal combustion engine 1 is resumed, so that the restarting of the internal combustion engine 1 is completed. In addition, also in FIG. 11, because the restarting condition is satisfied by the time the internal combustion engine 1 is stopped, the internal combustion engine stop flag (B) is kept "0".

Also in the case where the restarting condition is satisfied after the internal combustion engine 1 has stopped (after the time instant T4 in FIG. 8), operation similar to that represented in FIG. 11 is performed as the restart control. In that case, the difference from the operation represented in FIG. 11 is whether the internal combustion engine 1 is rotating or stopped, i.e., whether the internal combustion engine stop flag (B) is "0" or "1". Additionally, the intake pressure (E) also differs; however, because the throttle valve at a time of restarting is set through the restarting throttle valve setting in accordance with the intake pressure at the time of restarting, there exists no problem in the restartability.

As described above, in the internal-combustion-engine automatic stop and restart system according to Embodiment 1 of the present invention, when the rotation speed Ne becomes lower than the second predetermined rotation speed Ne2 while the internal combustion engine 1 inertially rotates, the throttle valve 6 is opened; therefore, because there can rapidly be performed restarting after the restarting condition has been satisfied, no combustion failure is caused. Moreover, in a time period from a time instant when the rotation of the internal combustion engine 1 stops to a time instant when the restarting condition is satisfied, the control of the throttle valve 6 is stopped; thus, no electric power is consumed wastefully.

Still moreover, the throttle valve 6 is controlled when the internal combustion engine 1 is in the automatic stopping mode so that fluctuation in the rotation speed of the internal combustion engine 1 is suppressed; therefore, even when the rotation speed Ne of the internal combustion engine 1 is equal to a rotation speed at which the starter 15 needs to perform acceleration, restarting can be implemented by making the pinion gear 17 engage with the ring gear 16, without performing any complicated calculation. As a result, the calculation load on the ECU 22 is prevented from becoming excessive.

Various modifications and alterations of this invention will be apparent to those skilled in the art without departing from the scope and spirit of this invention, and it should be understood that this is not limited to Embodiment 1 set forth herein.

What is claimed is:

1. An internal-combustion-engine automatic stop and restart system performing automatic stopping operation for automatically stopping an internal combustion engine when an automatic stopping condition is satisfied while the internal combustion engine is operated and performing restarting operation for restarting the internal combustion engine when a restarting condition is satisfied while the internal combustion engine is in an automatic stopping operation, the internal-combustion-engine automatic stop and restart system, characterized by further comprising:

a rotation speed calculation unit that calculates a rotation speed of the internal combustion engine;

a throttle valve that adjusts intake air of the internal combustion engine;

a ring gear coupled with the crankshaft of the internal combustion engine;

a pinion gear that is driven to rotate by a starter motor for restarting the internal combustion engine;

a pinion pushing unit that pushes out the pinion gear toward the ring gear;

a restarting control unit that performs restarting control of the internal combustion engine by making the pinion pushing unit push out the pinion gear so as to engage the pinion gear with the ring gear, when the restarting condition is satisfied in a time period from a time instant when the automatic stopping condition is satisfied to a time instant when the rotation of the internal combustion engine stops; and a throttle valve control unit that opens the throttle valve even when the restarting condition has not been satisfied, when the rotation speed of the internal combustion engine calculated by the rotation speed calculation unit becomes lower than a predetermined value in a time period from a time instant when the automatic stopping condition is satisfied to a time instant when the rotation of the internal combustion engine stops, and that stops control of the throttle valve in a time period from a time instant when the rotation of the internal combustion engine stops to a time instant when the restarting condition is satisfied.

2. The internal-combustion-engine automatic stop and restart system according to claim 1, wherein the throttle valve control unit sets the control amount for the throttle valve to a first predetermined value in a time period from a time instant when the automatic stopping condition is satisfied to a time instant when the rotation speed of the internal combustion engine reaches a first predetermined rotation speed; the throttle valve control unit sets the control amount for the throttle valve to a second predetermined value, which is smaller than the first predetermined value, until the rotation speed of the internal combustion engine, which is lower than the first predetermined rotation speed, reaches a second predetermined rotation speed; the throttle valve control unit sets the control amount for the throttle valve to a third predetermined value, which is larger than the second predetermined value, until the rotation speed of the internal combustion engine, which is lower than the second predetermined rotation speed, reaches zero; and the throttle valve control unit stops control of the throttle valve when the rotation of the internal combustion engine stops.

3. The internal-combustion-engine automatic stop and restart system according to claim 1, wherein, when the restarting condition is satisfied in a time period from a time instant when the automatic stopping condition is satisfied to a time instant when the rotation speed of the internal combustion engine reaches a first predetermined rotation speed, control of the throttle valve performed by the throttle valve control unit is stopped and the control amount for the throttle valve is set to a value calculated based on the intake pressure of the internal combustion engine; concurrently, fuel supply to the internal combustion engine is resumed, so that the internal combustion engine is restarted without making the restarting control unit operate.

4. The internal-combustion-engine automatic stop and restart system according to claim 1, wherein, when the restarting condition is satisfied in a time period from a time instant when the automatic stopping condition is satisfied to a time instant when the rotation speed of the internal combustion engine, which is the same as or lower than a first predetermined rotation speed, reaches a second predetermined rotation speed that is lower than the first predetermined rotation speed, control of the throttle valve performed by the throttle valve control unit is stopped and the control amount for the throttle valve is set to a value calculated based on the intake pressure of the internal combustion engine, and at the same time, the starter motor is driven; then, when the rotation speed of the internal combustion engine and the rotation speed of the pinion gear coincide with each other, the pinion pushing unit pushes out the pinion gear so as to engage the pinion gear with the ring gear so that the starter motor accelerates and restarts the internal combustion engine.

5. The internal-combustion-engine automatic stop and restart system according to claim 1, wherein the control amount for the throttle valve is set to a first predetermined value in a time period from a time instant when the automatic stopping condition is satisfied to a time instant when the rotation speed of the internal combustion engine reaches a first predetermined rotation speed; the control amount for the throttle valve is set to a second predetermined value, which is smaller than the first predetermined value, until the rotation speed of the internal combustion engine, which is lower than the first predetermined rotation speed, reaches a second predetermined rotation speed; the control amount for the throttle valve is set to a third predetermined value, which is larger than the second predetermined value, when the rotation speed of the internal combustion engine becomes the second predetermined rotation speed; and when the restarting condition is satisfied before the rotation speed of the internal combustion engine, which is the same as or lower than the second predetermined rotation speed, reaches zero, the control amount for the throttle valve is set to a value calculated based on the intake pressure of the internal combustion engine, and at the same time, fuel supply to the internal combustion engine is resumed and the restarting control unit is operated, so that the pinion pushing unit pushes out the pinion gear so as to engage the pinion gear with the ring gear and then the starter motor is driven so as to accelerate and restart the internal combustion engine.

\* \* \* \* \*